(12) United States Patent
Rosseau et al.

(10) Patent No.: US 12,277,544 B2
(45) Date of Patent: Apr. 15, 2025

(54) SYSTEMS AND METHODS FOR DYNAMIC CARD IDENTIFIER BASED TRANSACTIONS

(71) Applicant: AMERICAN EXPRESS TRAVEL RELATED SERVICES COMPANY, INC., New York, NY (US)

(72) Inventors: Bob Rosseau, Islamorada, FL (US); Paul D. Fabara, New York, NY (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 464 days.

(21) Appl. No.: 16/597,751

(22) Filed: Oct. 9, 2019

(65) Prior Publication Data

US 2020/0118113 A1    Apr. 16, 2020

Related U.S. Application Data

(60) Provisional application No. 62/744,553, filed on Oct. 11, 2018.

(51) Int. Cl.
*G06Q 20/34* (2012.01)
*G06F 21/32* (2013.01)
*G06F 21/45* (2013.01)
*G06Q 20/38* (2012.01)

(52) U.S. Cl.
CPC ........... *G06Q 20/341* (2013.01); *G06F 21/32* (2013.01); *G06F 21/45* (2013.01); *G06Q 20/3821* (2013.01)

(58) Field of Classification Search
CPC .. G06Q 20/341; G06Q 20/3821; G06F 21/32; G06F 21/45
See application file for complete search history.

(56) References Cited

U.S. PATENT DOCUMENTS

| 10,657,520 B2* | 5/2020 | Zarakas | G06Q 20/3829 |
|---|---|---|---|
| 2013/0198859 A1* | 8/2013 | Atkinson | G06Q 30/0601 726/27 |
| 2016/0342996 A1* | 11/2016 | Navarro Luft | G06Q 20/40145 |
| 2017/0221047 A1* | 8/2017 | Veerasangappa Kadi | G06Q 20/3829 |
| 2018/0033013 A1* | 2/2018 | Park | G06Q 20/4097 |
| 2018/0089688 A1* | 3/2018 | Kohli | G06Q 20/4016 |
| 2018/0096354 A1 | 4/2018 | Kohli | |
| 2018/0114036 A1* | 4/2018 | Spodak | G16H 10/60 |
| 2019/0057390 A1* | 2/2019 | Maheshwari | G06Q 20/409 |
| 2020/0019961 A1* | 1/2020 | Silvestre | G06Q 20/308 |

FOREIGN PATENT DOCUMENTS

CA    3039264    6/2017

* cited by examiner

*Primary Examiner* — Mike Anderson
*Assistant Examiner* — Matthew Cobb
(74) *Attorney, Agent, or Firm* — Thomas Horstemeyer, LLP

(57) ABSTRACT

A system for system for dynamic card identifier based transactions is disclosed. The system may receive a transaction authentication request. The system may generate a first dynamic card identifier (DCID) in response to the transaction authentication request. The system may authenticate a transaction based on the first DCID. The system may execute the transaction in response to the authenticating. In various embodiments, the system may generate a second DCID in response to executing the transaction.

15 Claims, 2 Drawing Sheets

SYSTEMS AND METHODS FOR DYNAMIC CARD IDENTIFIER BASED TRANSACTIONS

CROSS REFERENCE TO RELATED APPLICATIONS

This application is a non-provisional of, claims priority to and the benefit of, Provisional U.S. Ser. No. 62/744,553 filed Oct. 11, 2018 and entitled "SYSTEMS AND METHODS FOR DYNAMIC CARD IDENTIFIER BASED TRANSACTIONS," which is hereby incorporated by reference in its entirety for all purposes.

FIELD

This disclosure relates to inhibiting various forms of attempted fraud and risk associated with a transaction. More particularly, the disclosure relates to systems and methods that store and manage account information and identity verification in payment card based transaction systems.

BACKGROUND

Transaction cards, also known as payment cards, are not only information carriers, but also typically allow a consumer to pay for goods and services, without the need to constantly possess cash. If a consumer needs cash, transaction cards allow access to funds through, for example, an automatic teller machine (ATM) and cashback at the point of sale. Transaction cards also reduce the exposure to the risk of cash loss through theft and reduce the need for currency exchanges when traveling to various foreign countries. Due to the advantages of transaction cards, hundreds of millions of cards are now produced and issued annually, thereby resulting in a need for companies to differentiate their cards from competitor's cards.

Initially, the transaction cards often included the issuer's name, the cardholder's name, the card number, and the expiration date embossed onto the card. The cards also usually included a signature field on the back of the card for the cardholder to provide a signature to help protect against forgery and tampering. Thus, the cards served as devices to provide data to merchants and the security associated with the card was the comparison of the cardholder's signature on the card to the cardholder's signature on a receipt along with the embossed cardholder's name on the card.

Administrative and security issues (e.g., charges, credits, merchant settlement, fraud, reimbursements, etc.) have increased due to the increasing use of transaction cards. Thus, the transaction card industry started to develop more sophisticated transaction cards which allowed the electronic reading, transmission, and authorization of transaction card data for a variety of industries. For example, magnetic stripe cards, optical cards, smart cards, and calling cards have been developed to meet the market demand for expanded features, functionality, and security. In addition to the visual data, the incorporation of a magnetic stripe on the back of a transaction card allows digitized data to be stored in machine readable form. As such, magnetic stripe readers are used in conjunction with magnetic stripe cards to communicate purchase data received from a cash register device on-line to a host computer, along with the transmission of data stored in the magnetic stripe (e.g., account information and expiration date).

The incorporation of machine-readable components onto transactions cards encouraged the proliferation of devices to simplify transactions by automatically reading from and/or writing onto transaction cards. Such devices include, for example, bar code scanners, magnetic stripe readers, point of sale terminals (POS), automated teller machines (ATM) and card-key devices.

Due to the susceptibility of the magnetic stripe to tampering, the lack of confidentiality of the information within the magnetic stripe and the problems associated with the transmission of data to a host computer, integrated circuits were developed which may be incorporated into transaction cards. These integrated circuit (IC) cards, known as smart cards or chip cards, proved to be very reliable in a variety of industries due to their advanced security and flexibility for future applications. However, even integrated circuit cards are susceptible to counterfeiting.

Payment cards may store information onboard the payment card in one or more formats, for example, an EMV card including a magnetic strip and a chip. A customer may initiate a transaction at a point of sale by inserting or 'dipping' the card into a card reader at the point of sale. The card reader may read data from the magnetic strip or form the integrated circuit. For chip enabled card readers, in response to dipping the card and thereby initiating the transaction the EMV card may generate a one-time use transaction authenticator (e.g., a unique transaction code) which may not be reused. Generally, the transaction authenticator is based on a primary account number (PAN) associated on a one-to-one basis with the EMV card. In this regard, EMV cards tend to enhance transaction security when used with a chip compatible card reader tending thereby to reduce point of sale fraud. However, a technical problem exists where EMV cards are used with magnetic strip readers or where the transaction is conducted online, via phone, or mail which do not benefit from the enhanced transaction security and the unique transaction code. Furthermore, a technical problem exists in that a customer associated with many PANs or card products may tend to require multiple EMV cards to initiate multiple transactions.

SUMMARY

Systems and methods (collectively, the "system") for dynamic card identifier based transactions are disclosed. The system may include a processor and a tangible, non-transitory memory configured to communicate with the processor, the tangible, non-transitory memory having instructions stored thereon that, in response to execution by the processor, cause the processor to perform operations comprising, receiving a transaction authentication request, generating a first dynamic card identifier (DCID), authenticating a transaction based on the first DCID, and executing the transaction in response to the authenticating.

In various embodiments, the system may determine a selected product based on the first DCID. The system may compare the selected product to an authorized product set and allocated the transaction to the selected product. In various embodiments, the system may compare a biometric data with a stored biometric data. The system may determine an authorized product set based on the comparison of the biometric data. In various embodiments, the system may generate the first DCID in response to a biometric verification message generated in response to the comparison of the biometric data with the stored biometric data. The system may generate a second DCID in response to executing the transaction.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. However, a more complete understanding of the present disclosure may be obtained by referring to the detailed description and claims when considered in connection with the drawing figures, wherein like numerals denote like elements.

DETAILED DESCRIPTION

The system may provide a greater level of sophistication and control for bank card based transactions. Benefits of the present disclosure may apply to any suitable use of bank card based transactions. For example, the present disclosure may be applicable in point of sale transactions as well as in remote transactions, for example, online or telephonic transactions. Prior art systems typically include the technical problem of needing multiple bank cards to initiate different transactions. Moreover, prior art systems often include degraded fraud protection in a remote transaction. As such, the current system provides a technical solution by generating a dynamic card identifier (DCID). In this regard, the system may associate multiple PANs or card products to a single bank card and enable one-time use transaction authenticators based on the card identifier. The system may reduce the number of bank cards for initiating different transactions. The system may also reduce fraudulent transaction requests, thereby reducing a demand for system resources.

Figure 1:
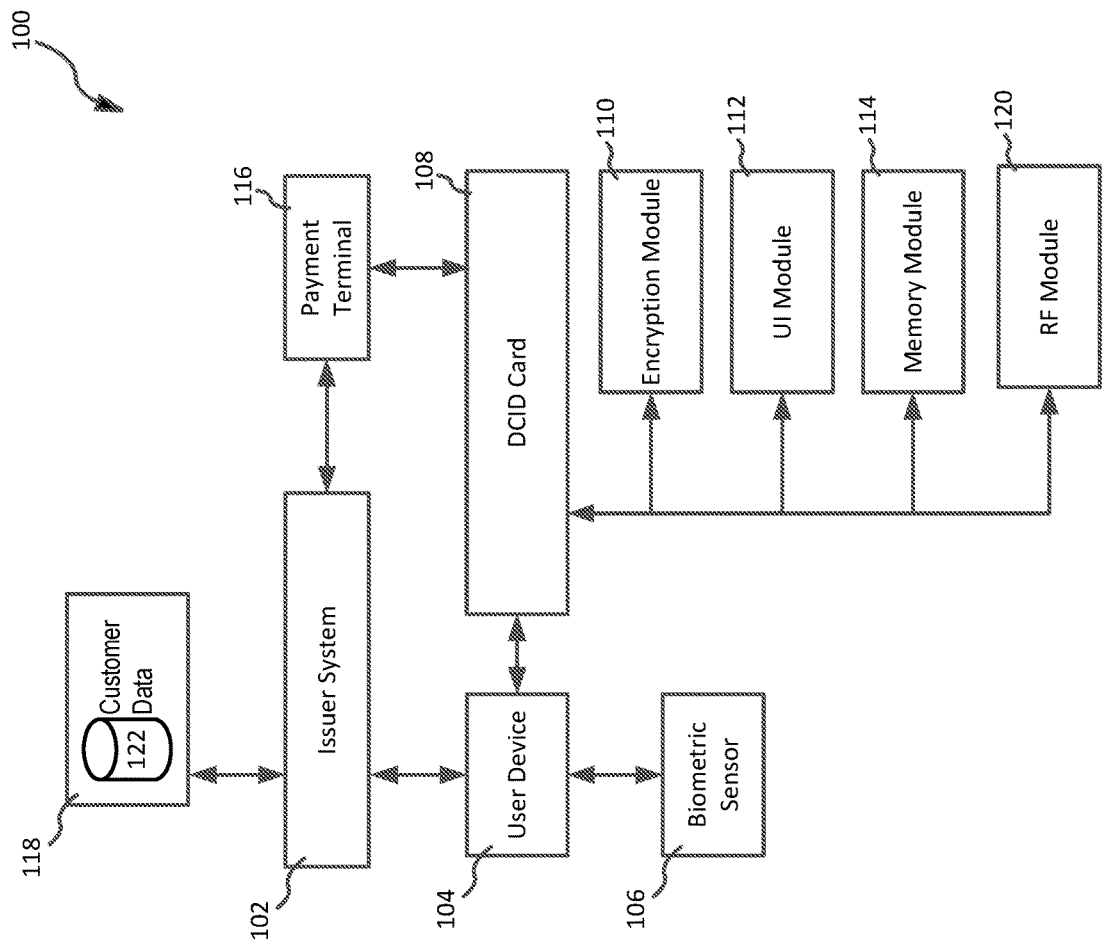
FIG. 1 is a block diagram illustrating a dynamic card identifier based transaction system, in accordance with various embodiments.

With reference to FIG. 1, a dynamic card identifier based transaction system 100 is depicted according to various embodiments. System 100 may comprise issuer system 102, user device 104, Dynamic Card Identifier (DCID) card 108, payment terminal 116, and database 118. Any of these components may be outsourced and/or be in communication with issuer system 102. In various embodiments, issuer system 102 may further comprise interface modules such as, for example, Application Programming Interfaces (APIs), gateways, network components and the like. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein Issuer system 102 may interact with system 100 to process and store transaction information and/or the like. Issuer system 102 may comprise any suitable combination of hardware, software, and/or database components. For example, may comprise one or more network environments, servers, computer-based systems, processors, databases, and/or the like. Issuer system 102 may comprise at least one computing device in the form of a computer or processor, or a set of computers/processors, although other types of computing units or systems may be used, such as, for example, a server, web server, pooled servers, or the like. Issuer system 102 may also include one or more data centers, cloud storages, or the like, and may include software, such as APIs, configured to retrieve and write data to database 118, user device 104, payment terminal 116, and/or DCID card 108. In various embodiments, issuer system 102 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein In various embodiments, issuer system 102 may comprise or interact with a traditional payment network to facilitate purchases and payments, authorize transactions, and/or settle transactions. For example, issuer system 102 may represent existing proprietary networks that presently accommodate transactions for credit cards, debit cards, and/or other types of transaction accounts or transaction instruments. Issuer system 102 may be a closed network that is secure from eavesdroppers. In various embodiments, issuer system 102 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network. Issuer system 102 may include systems and databases related to financial and/or transactional systems and processes, such as, for example, one or more authorization engines, authentication engines and databases, settlement engines and databases, accounts receivable systems and databases, accounts payable systems and databases, and/or the like. For example, issuer system 102 may authorize and settle payment transactions, and maintain transaction account member databases, accounts receivable databases, accounts payable databases, or the like Although the present disclosure makes reference to issuer system 102, it should be understood that principles of the present disclosure may be applied to a DCID based transaction system having any suitable number of issuer systems that interface with DCID card 108.

In various embodiments, user device 104 may be configured to provide user access to issuer system 102. For example, the user may interact with issuer system 102 to input customer data, initiate and/or establish transactions with merchants, view transaction validations, select card identifiers, select card products, visualize data and/or the like. User device 104 may be in electronic communication with issuer system 102 and communicate with DCID card 108, and may comprise any suitable hardware, software, and/or database components capable of sending, receiving, and storing data. For example, user device 104 may comprise a personal computer, personal digital assistant, cellular phone, smartphone (e.g., IPHONE®, BLACKBERRY®, and/or the like), Internet of things (IoT) device, kiosk, and/or the like. User terminal 212 may comprise an operating system, such as, for example, a WINDOWS® mobile operating system, an ANDROID® operating system, APPLE® IOS®, a BLACKBERRY® operating system, and the like. User device 104 may comprise software components configured to allow a user, via user device 104, access to a user interface of issuer system 102 and/or DCID card 108. For example, user device 104 may comprise a web browser (e.g., MICROSOFT INTERNET EXPLORER®, GOOGLE CHROME®, etc.), an application, a micro-app or mobile application (e.g., downloaded via APPLE® APP STORE®, GOOGLE PLAY®, etc.), or the like, configured to allow a user to access and interact with the user interface.

In various embodiments, the user interface may be accessible via user device 104. The user interface may comprise software, a web page, or the like, and may be accessible via a web browser, a mobile application, or the like on user device 104. In that regard, the user, via user device 104, may access the user interface to register for the DCID card, submit account creation information, submit biometric data, visualize information, and establish transactions.

In various embodiments, biometric sensor 106 may be in electronic communication with user device 104, issuer system 102, and/or DCID card 108, and may comprise any suitable hardware, software, and/or database components capable of sending, receiving, and storing data. Biometric sensor 106 may comprise any suitable sensor capable of measuring and recording biometric data of a user such as, for example, a fingerprint, a voiceprint, a faceprint, a retinal scan, an iris scan, and/or the like. In various embodiments, biometric sensor may record any suitable biometric data known to those in the art. In various embodiments, the biometric sensor may be an onboard sensor of DCID card 108.

In various embodiments, payment terminal 116 may comprise a device which interfaces with a payment card such as DCID card 108 to make electronic funds transfers. Payment terminal 116 may comprise any suitable hardware, software, and/or database components capable of sending, receiving, and storing data. For example, payment terminal 116 may comprise a personal computer, personal digital assistant, cellular phone, smartphone (e.g., IPHONE®, BLACKBERRY®, and/or the like), Internet of things (IoT) device, kiosk, PoS terminal (e.g., VERIFONE® or INGENICO®, etc.), and/or the like. Payment terminal 116 may comprise an operating system, such as, for example, a WINDOWS® mobile operating system, an ANDROID® operating system, APPLE® IOS®, a BLACKBERRY® operating system, and the like. Payment terminal 116 may comprise software and/or hardware components configured to allow a user, via DCID card 108, access to a transaction authorization process of issuer system 102.

In various embodiments, DCID card 108 includes an encryption module 110, a UI module 112, a memory module 114, and an RF module 120. DCID card 108 may include one or more processors and/or one or more tangible, non-transitory memories and be capable of implementing logic. The processor may be configured to implement various logical operations in response to execution of instructions, for example, instructions stored on a non-transitory, tangible, computer-readable medium. DCID card 108 may be standard-sized (i.e., about 3⅜ inches by about 2¼ inches by about 0.03 inches, and/or those dimensions specified in ISO 7810 and ISO 7811, for example, for an "ID-1" card) or any other size specified in ISO 7810 and ISO 7811. DCID card 108 may also be any other size or configuration still usable as a transaction card (e.g., a larger transaction card, small transaction card, reduced size transaction card, foldable transaction card, the card being part of another device, the card being removed from another device). Moreover, DCID card 108 may have a magnetic stripe, an embedded microchip, a signature panel, a holographic image, and/or any feature typically contained on or within the transaction card. The transaction card may have a card body comprised of a ceramic material. Various foldable cards and/or transaction cards of non-traditional size may be found in the below U.S. Patent documents, all of which are herein incorporated by reference in their entirety: U.S. patent application Ser. No. 10/906,731 filed on Mar. 3, 2005 and entitled System and Method for Non-Traditionally-Sized RF Transaction Card, U.S. patent application Ser. No. 10/906,732 filed on Mar. 3, 2005 and entitled Foldable Non-Traditionally-Sized RF Transaction Card System and Method, which issued as U.S. Pat. No. 7,156,301 on Jan. 2, 2007, U.S. patent application Ser. No. 10/436,343 filed on May 12, 2003 and entitled Compact or Convenient Transaction Cards, which issued as U.S. Pat. No. 7,124,955 on Oct. 24, 2006, and U.S. patent application Ser. No. 10/733,619 filed on Dec. 10, 2003 and entitled Foldable Transaction Card Systems, which issued as U.S. Pat. No. 7,147,151 on Dec. 12, 2006.

Memory module 114 may be configured to store and maintain DCID card data such as card product ID, card ID, ciphers, PANs, biometric information, and/or the like. Memory module 114 may store the DCID card data using any suitable technique described herein or known in the art. DCID card data may be in operative and/or electronic communication with encryption module 110, UI module 112, payment terminal 116, user device 104, biometric sensor 106, issuer system 102, RF module 120 and/or database 118.

UI module 112 may include an optical display element such as, for example, one of an LED, LCD, OLED and/or the like. The optical display element may display data optically to a user. UI module may include one or more sensors configured to receive a selection input from a user. UI module may be may be in operative and/or electronic communication with encryption module 110, UI module 112, payment terminal 116, user device 104, biometric sensor 106, issuer system 102, and/or database 118.

Encryption module 110 may be configured to generate a DCID in response to receiving a selection input. In various embodiments, encryption module 110 may generate the DCID as a function of a first cipher and a Card ID or may generate the DCID as a function of a plurality of ciphers or may generate the DCID as a function of a card product. For example, the DCID may be generated based on a set of constants associated on a one to one basis with a set of card products and the cipher may include a variable for the set of constants. In another example, each of the plurality of ciphers may be associated with a plurality of card products and/or PANs on a one-to-one basis.

RF module 120 may include an integrated antenna so that a processor within RF module 120 may facilitate contact based "smartcard" transactions as well as wireless transactions via a wireless interface and an antenna of RF module 120 such as, for example, via BLUETOOTH and/or near field communication (NFC) technologies. RF module 120 may thus comprise any suitable recordable media, for example, an integrated circuit. Integrated RF module 510 may also comprise a wireless interface configured to transmit wireless information via an antenna integrated into integrated RF module 510. RF module 120 includes network of electronic circuitry that is printed or otherwise incorporated onto or within the transaction instrument (and typically referred to as a "smart card"); a fob having a transponder and an RFID reader; and/or NFC technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

In various embodiments, the system may generate a unique card identifier (CID) and associate the CID with a DCID card. The CID and the DCID card may be associated on a one to one basis. The system may start an authentication process and receive an authentication input from the user. The system may determine, based on the authentication input, a user authentication sate. In response to the user authentication state, the system may prompt the user for biometric data. Biometric sensor 106 may receive the biometric data and the system may store the biometric data in database 118 as customer data 122. The biometric data may be stored on a one-to-one basis with the customer data (i.e. user data), and in this regard may be used to validate the identity of a user. The system may prompt the user to select one or more PANs (e.g., a first PAN, a second PAN, a third PAN etc.) and/or one or more card product IDs (e.g., a first card product, a second card product, a third card product etc.) to associate with the CID and may receive a selected products data comprising the selected PANs and/or card product IDs (e.g., the first selected product, the second selected product, the third selected product). In response to the selected products. data the DCID card 108 may store the selected products data in memory module 114.

In various embodiments, the system may receive a transaction request and in response may start a transaction authorization process. The system may prompt the user for a transaction authorization input via the payment terminal 116 and/or the user device 104. The transaction authorization input may include an identity verification request such as, for example, a biometric input request. The system may receive biometric data from biometric sensor 106 in response to the biometric input request and may compare the biometric data with the biometric data stored as customer data 122. In response to the comparison, the system may determine an authorized products set (e.g., the selected products associated with the user) and may generate a biometric verification message.

In various embodiments, the transaction authorization input may include a dynamic card identifier (DCID). The user may access a selected card product stored in memory module 114 via UI module 112 to execute the transaction. DCID card 108 may receive the biometric verification message and, in response, encryption module 118 may generate a first DCID based on the selected card product and the CID. In various embodiments, the DCID may be based on one or more ciphers, wherein each cipher is associated on a one-to-one basis with a selected product. For example, a first cipher associated with the first selected product, a second cipher associated with the second selected product, etc. In various embodiments, a cipher may be associated with the selected products on a one-to-many basis. In various embodiments, a DCID may comprise a one-time-use authorization token.

The system may receive the first DCID and determine the selected product (i.e., one of the first selected product, the second selected product, the third selected product, etc.) based on the first DCID to generate a determined card product. The system may compare the determined card product with the authorized products set. In response to the comparison, the system may execute the transaction.

Figure 2:
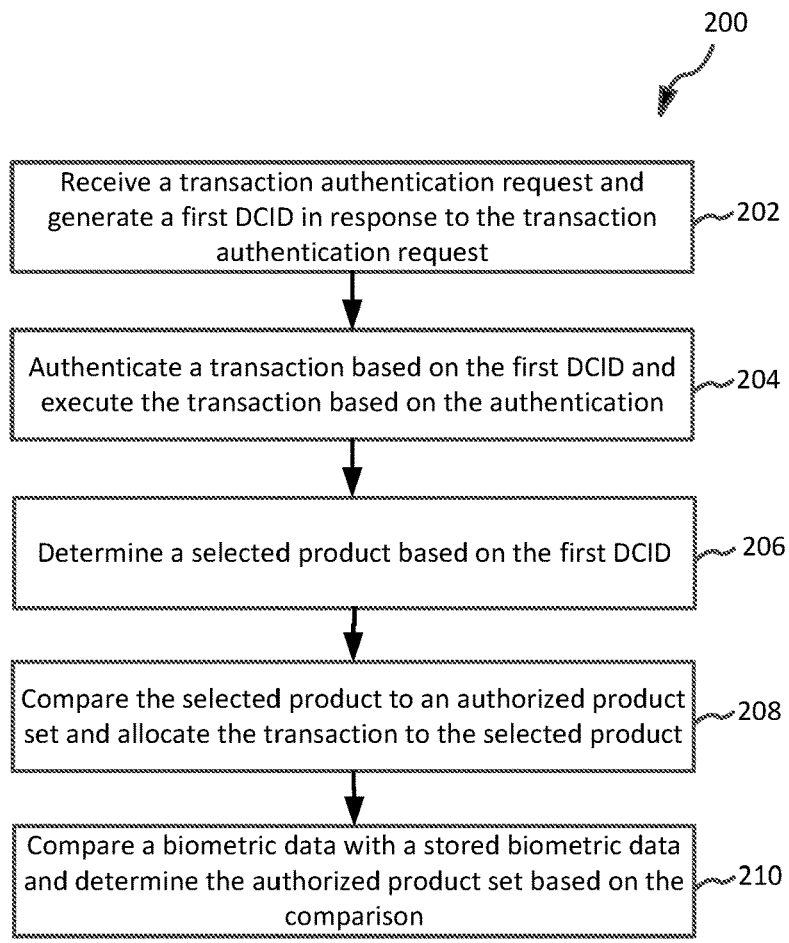
FIG. 2 illustrates a process flow in a dynamic card identifier based transaction system, in accordance with various embodiments.

With additional reference to FIG. 2, a transaction process flow 200 in a dynamic card identifier based transaction system is illustrated in accordance with various embodiments. Process 200 includes receiving a transaction authentication request and generating a first dynamic card identifier (DCID) in response to the transaction authentication request (step 202). The system may authenticate a transaction based on the first DCID and may execute the transaction in response to the authenticating (step 204). In various embodiments, process 200 includes determining a selected product based on the first DCID (step 206). Process 200 includes comparing the selected product to an authorized product set and allocating the transaction to the selected product (step 208). In various embodiments, process 200 includes comparing a biometric data with a stored biometric data and determining the authorized product set based on the comparison between the biometric data and the stored biometric data (step 210).

In various embodiments, systems and methods for implementing secure transactions include online purchases over the Internet. These solutions allow network or Internet users to more securely perform online transactions with other parties such as banking and financial institutions, vendors of merchandise and/or services or other transactions conducted over the Internet or a computer network. The occurrence of incidents involving electronic interception or session tampering or hijacking can be detected to alert companies who can thereby initiate responsive actions to prevent fraud, identify credit card theft and reduce financial loss.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

A transaction card may be a charge card, credit card, debit card, awards card, prepaid card, telephone card, smart card, magnetic stripe card, bar code card, transponder, radio frequency card and/or the like. The transaction card may have an associated account number (e.g., embossed, printed, and/or accessed), which cardholders typically present to merchants or use to interact with a machine, as part of a transaction, such as a purchase.

An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, ceramic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

An account number may identify a consumer. In addition, a consumer may be identified by a variety of identifiers including, for example, an email address, a telephone number, a cookie id, a radio frequency identifier (RFID), a biometric, a geographic indicator and/or the like. The card may be associated with, have access to or include a rewards account, charge account, credit account, debit account, prepaid account, telephone card, embossed card, smart card, magnetic stripe card, bar code card, transponder, radio frequency card, key card, access card or an associated account. The various communications discussed herein may be performed using a network.

As used herein, the term "network" may further include any cloud, cloud computing system or electronic communications system or method that incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, AppleTalk, IP-6, NetBIOS, OSI, any tunneling protocol (e.g., IPsec, SSH, etc.), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), quantum based encryption systems, and symmetric and asymmetric cryptosystems.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The computer system or any components may integrate with system integration technology such as, for example, the ALEXA system developed by AMAZON®. ALEXA is a cloud-based voice service that can help you with tasks, entertainment, general information and more. All AMAZON® ALEXA devices, such as the AMAZON ECHO®, AMAZON ECHO DOT®, AMAZON TAP®, and AMAZON FIRE® TV, have access to the ALEXA system. The ALEXA system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The ALEXA system may allow the user to access information about eligible accounts linked to an online account across all ALEXA-enabled devices.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, or object-oriented structure and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MySQL by MySQL AB (Uppsala, Sweden), MONGODB®, REDIS®, APACHE CASSANDRA®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (e.g., 10.0.0.2). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEB SPHERE® MQTM (formerly MQSeries) by IBM®, Inc. (Armonk, NY) is an example of a commercially available middleware product. An Enterprise Service Bus ("ESB") application is another example of middleware.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system, comprising:
    a card comprising a radiofrequency antenna, a processor and a memory; and
    machine-readable instructions stored in the memory that, when executed by the processor, cause the processor to at least:
        obtain a selection of a card product, wherein the card product is stored in the memory;
        receive a biometric verification message from a user device, the biometric verification message comprising biometric data;
        compare the biometric data to stored biometric data to determine that the biometric data matches the stored biometric data, the stored biometric data being stored in the memory;
        generate a first dynamic card identifier (DCID) using an encryption module in response to a determination that the biometric data matches the stored biometric data, the DCID being associated with the card product;
        send the first DCID and the biometric data to a payment terminal; and
        generate a second DCID using the encryption module in response to execution of a transaction.

2. The system of claim 1, wherein the machine-readable instructions, when executed by the processor, further cause the computing device to authenticate the transaction.

3. The system of claim 2, wherein the machine-readable instructions that cause the computing device to authenticate the transaction further cause the computing device to at least:
    determine a selected product based on the first DCID;
    compare the selected product to an authorized product set; and
    allocate the transaction to the selected product.

4. The system of claim 1, wherein the instructions, when executed by the processor, further cause the system to at least determine that the card product is a member of an authorized product set based at least in part on the comparison of the biometric data to the stored biometric data.

5. The system of claim 1, wherein the first DCID is generated as a function of the card product.

6. A method, comprising:
   obtaining, via a user interface module, a selection of a card product stored in a memory module of a dynamic card;
   receiving, via a card having a processor, a biometric verification message from a user device, the biometric verification message comprising biometric data;
   comparing, via the processor, the biometric data to stored biometric data to determine that the biometric data matches the stored biometric data, the stored biometric data being stored in the memory module;
   generating, via the processor, a first dynamic card identifier (DCID) using an encryption module in response to determining that the biometric data matches the stored biometric data, the first DCID being associated with the card product;
   sending, via the processor, the DCID and the biometric data to a payment terminal; and
   generating, via the processor, a second DCID using the encryption module in response to execution of a transaction.

7. The method of claim 6, further comprising authenticating the transaction based at least in part on the first DCID.

8. The method of claim 7, wherein authenticating the transaction further comprises:
   determining a selected product based on the first DCID;
   comparing the selected product to an authorized product set; and
   allocating the transaction to the selected product.

9. The method of claim 6, further comprising:
   determining that the card product is a member of an authorized product set based at least in part on the comparison of the biometric data to the stored biometric data.

10. The method of claim 6, wherein the DCID is generated as a function of the card product.

11. A card including a radiofrequency antenna, a non-transitory, tangible computer readable storage medium having instructions stored thereon that, in response to execution by a processor of the card, cause the card to at least:
    obtain a selection of a card product stored in the tangible, non-transitory memory;
    receive a biometric verification message from a user device, the biometric verification message comprising biometric data;
    compare the biometric data to stored biometric data to determine that the biometric data matches the stored biometric data, the stored biometric data being stored in the tangible, non-transitory memory;
    generate a first dynamic card identifier (DCID) using an encryption module in response to a determination that the biometric data matches the stored biometric data, the first DCID being associated with the card product;
    send the first DCID and the biometric data to a payment terminal; and
    generate a second DCID using the encryption module in response to execution of a transaction.

12. The article of manufacture of claim 11, wherein the instructions further cause the apparatus to at least authenticate the transaction.

13. The article of manufacture of claim 12, wherein the machine-readable instructions that cause the apparatus to authenticate the transaction further cause the apparatus to at least:
    determine a selected product based on the first DCID;
    compare the selected product to an authorized product set; and
    allocate the transaction to the selected product.

14. The article of manufacture of claim 11, wherein the instructions further cause the apparatus to at least determine that the card product is a member of an authorized product set based at least in part on the comparison of the biometric data to the stored biometric data.

15. The article of manufacture of claim 11, wherein the first DCID is generated as a function of the card product.

* * * * *